Aug. 19, 1941.                M. SELIG                 2,253,251
                   STERILIZING AND STORAGE CABINET
              Filed July 7, 1939          6 Sheets-Sheet 1

Inventor
Milton Selig
Depe + Kirchner
By
Attorneys

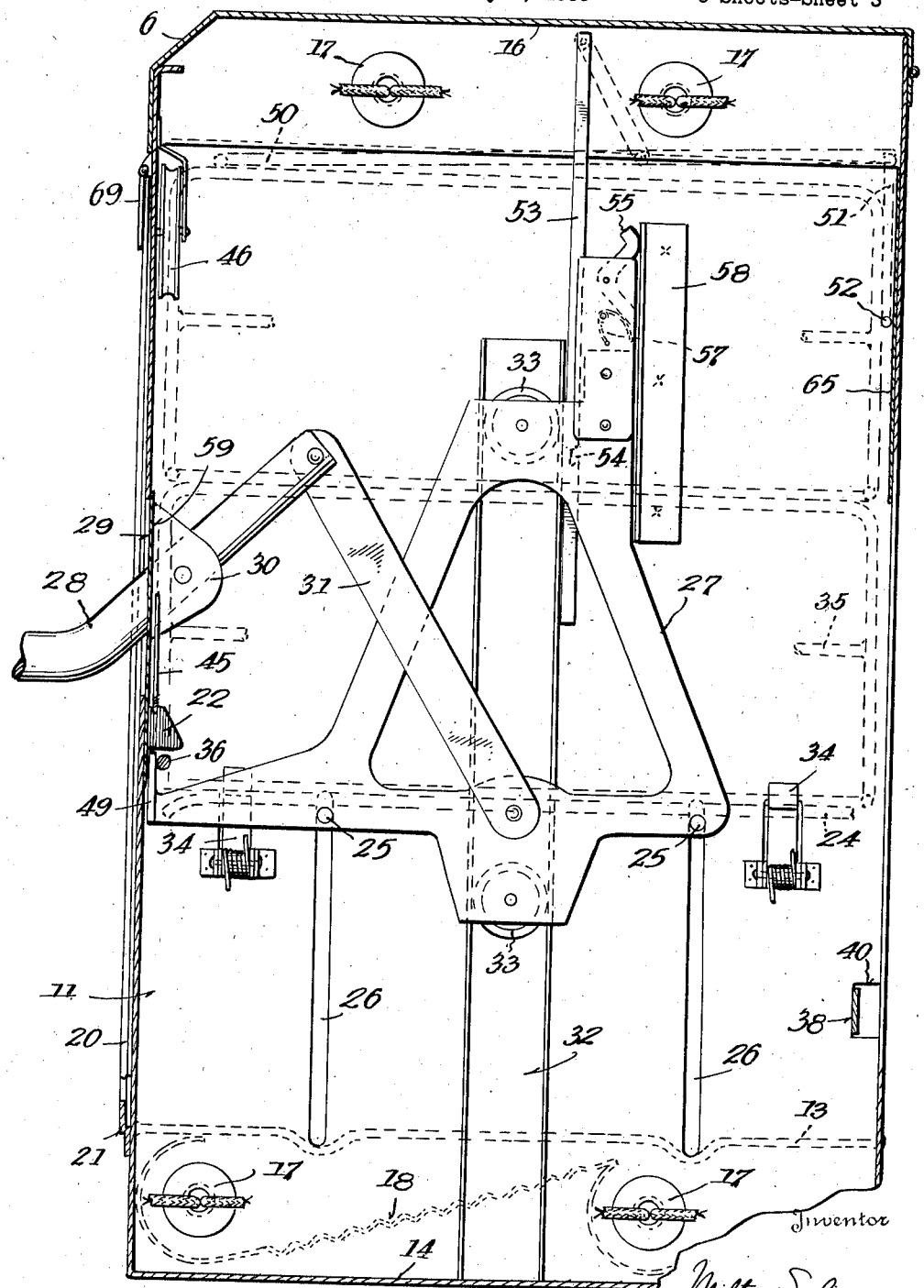

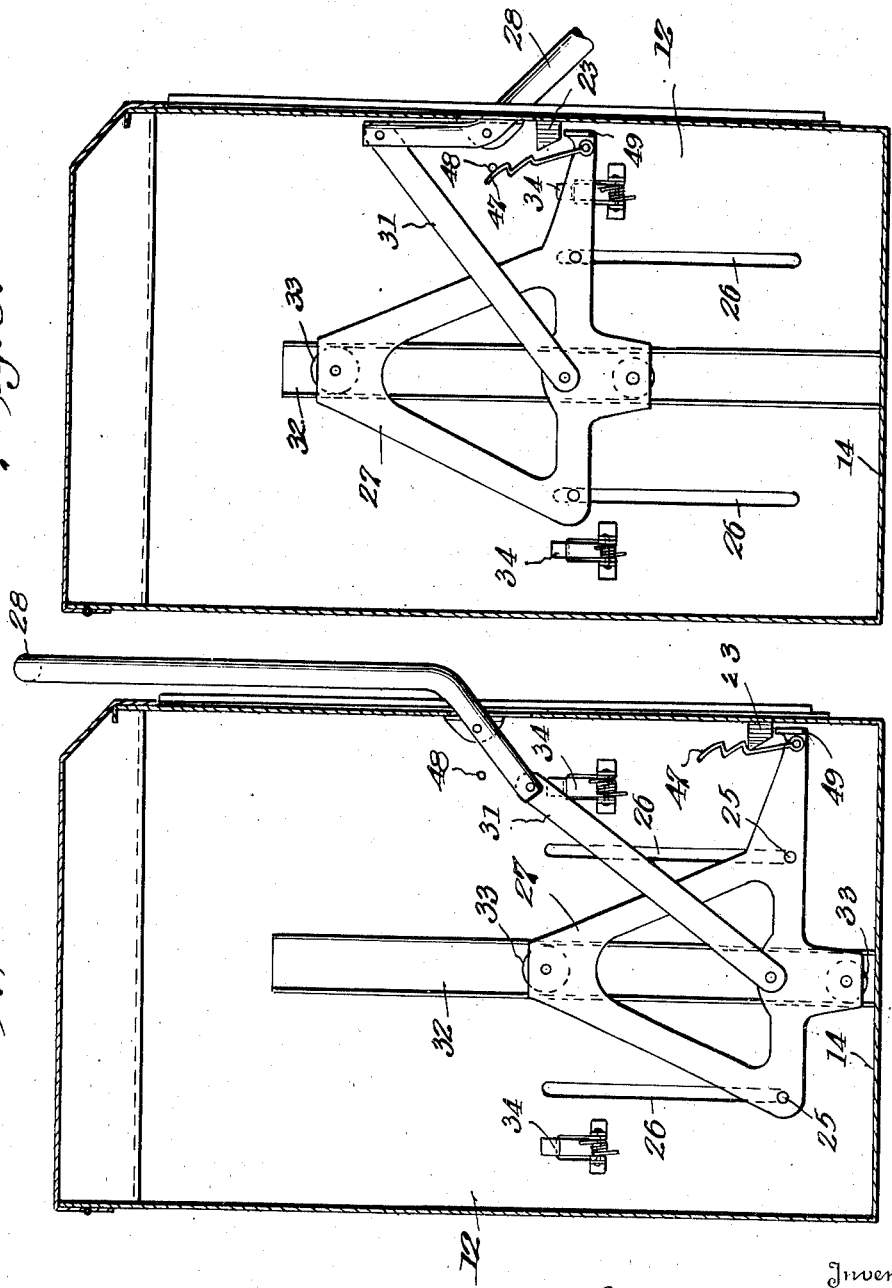

Aug. 19, 1941.　　　　M. SELIG　　　　2,253,251
STERILIZING AND STORAGE CABINET
Filed July 7, 1939　　　6 Sheets-Sheet 6

Inventor
Milton Selig
Dyer & Kirchner
By
Attorneys

Patented Aug. 19, 1941

2,253,251

UNITED STATES PATENT OFFICE 2,253,251

STERILIZING AND STORAGE CABINET

Milton Selig, Philadelphia, Pa., assignor to The Fischman Company, a corporation of Delaware Application July 7, 1939, Serial No. 283,280

35 Claims. (Cl. 250—52)

The present invention relates to cabinets for sterilizing such articles as tableware, particularly beverage glasses, and for storing such articles as an incident to their sterilization. The structure is of the general type shown in my United States Patent No. 2,146,688 issued February 7, 1939, and in my copending United States application Serial No. 254,930, filed February 6, 1939, and the present invention contemplates improvements in those prior devices.

In common with my prior constructions, the device contemplated by this present invention may be a cabinet or the like designed to sterilize any of a wide range of articles, but principally articles of tableware, such as beverage glasses and the like. The cabinet is therefore preferably of small size and neat appearance so as to be adapted to be mounted on a counter, back bar or the like of a restaurant, soda fountain or similar establishment, in full view of the customer to whom the articles are intended to be served.

The cabinet may be designed to receive and contain a plurality of articles and subject them to some sterilizing influence, preferably ultraviolet radiations. Provision may be made for inserting the articles through one opening in a wall of the cabinet and for withdrawing them through another opening. In that case the articles are moved in a path through the cabinet which extends from the admission opening to the withdrawal opening and it is during this passage along the path that they are subjected to the sterilizing influence.

While the foregoing roughly describes the general type of device to which the present invention relates, not all of the characteristics forming part of that description are essential to an embodiment of some of the new principles of the present invention, as those principles are defined in the appended claims. The foregoing description is given merely to suggest one kind of device, and indeed the preferred kind, in which the principles of the present invention may be embodied.

While the essential principles by which my prior constructions operate are sound and are therefore employed in the present improvement, difficulty has been experienced in practice with some of the mechanism which I have heretofore used in the embodiment of those principles. In some cases the parts have not operated smoothly over a sufficiently long period of time; certain features of the device have not proved to be as completely foolproof as was desired, so that irresponsible operators have been able to frustrate the intended and prescribed mode of operation; the parts have required servicing to correct maladjustment, compensate for wear, eliminate noisy operation, etc. A primary object of the present invention, therefore, is the improvement of the mechanical embodiment of the essential principles of my prior constructions to eliminate the foregoing and other defects.

Generally speaking, the improvements in mechanical embodiment relate mainly to the means for moving articles through the cabinet, the means for preventing access to newly inserted and hence incompletely sterilized articles, the means for preventing reverse or other unintended operation of the sterilizing cycle, the minimizing of radiation escape, the increase of the areas of the articles exposed to the rays, the enhancement of the appearance of the cabinet, the decreasing of the cubic space required by a cabinet in operation, and other factors which will be explained in or be apparent from the present disclosure.

A further object of the present invention is the incorporation of certain new principles in devices of this general type. Briefly, these new principles provide a cyclic operation calculated to effect practically complete sterilization by a certain predetermined mode of functioning of parts which cannot be made to operate otherwise than in that predetermined way. Consequently, to a very considerably greater degree than in the cases of my prior constructions, installation of the new cabinet in a restaurant or the like guarantees to the patrons and the proprietor that articles put into it will be completely sterilized before they are withdrawn, regardless of the carelessness or indifference of the actual operator or his lack of disposition to cooperate in the effort to sterilize the articles completely before setting them before a patron. In short, the new cabinet more completely than ever before eliminates the will of the operator as a factor in the sterilization procedure.

Further objects and advantages will be evident from the description hereinafter of certain preferred embodiments of the new invention.

The accompanying drawings illustrate a preferred embodiment of the new invention. In this present specification I shall describe and explain the particular structure which is shown in the drawings and which constitutes but one of many possible forms in which the broad principles of the invention may be incorporated. It will be understood, therefore, that the description of specific mechanism and structure is merely in explanation of the drawings embodiment and involves no limitation of the principles of the invention to that species. The principles of the invention will be pointed out in claims hereinafter, which are intended to have the broadest construction admitted by their express terms and by the requirements of the prior art.

In the drawings—

Fig. 6 is a view similar to Fig. 5 but showing the support-moving means in elevated position;

Fig. 7 is a sectional view through the other wall compartment showing the support-moving means in lowered position;

Fig. 8 is a view similar to Fig. 7 but showing the support-moving means in elevated position;

Figure 1:
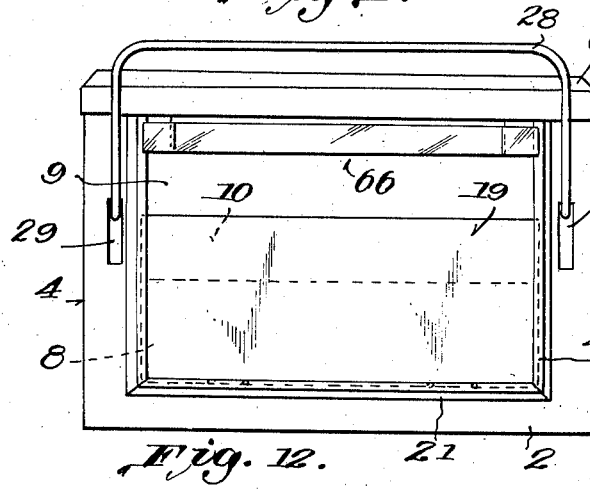
Fig. 1 is a front elevational view of the cabinet.
Figure 2:
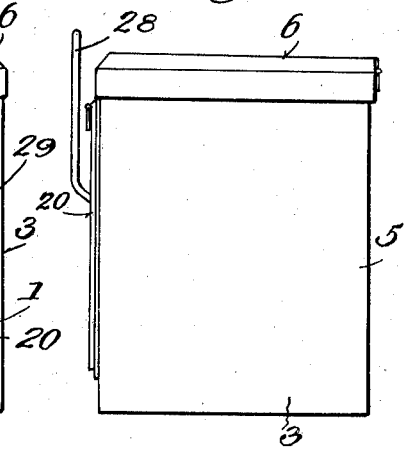
Fig. 2 is an end elevational view.

Referring now to the drawings, the cabinet comprises a box-like housing 1, preferably of ornamental metal, such as stainless steel, having a front wall 2, side walls 3 and 4 and a back 5. The top cover or lid 6 may be hinged or otherwise mounted on the vertical walls, and the bottom of the cabinet will be closed by a floor.

It is intended that the cabinet receive the articles to be sterilized on appropriate supports, such as the baskets 7, of which a plurality will be employed, and these baskets will be inserted into the cabinet and removed therefrom through appropriate openings. An admission opening for the baskets is designated 8 and a withdrawal opening is designated 9, both formed in the front wall 2 of the cabinet. These two openings may be separate portions or zones of a single large opening, or they may be separated by an intervening portion 10 of the front wall. In either case the upper opening or upper portion of the single large opening is the withdrawal opening, and the lower opening or lower portion of the single large opening is the admission opening.

The interior of the cabinet is provided with an internal side wall 11 spaced from the right hand wall 3 of the cabinet and a similar wall 12 spaced from the left hand wall 4 of the cabinet. The space between these walls 11 and 12 constitutes an internal chamber, comprising a vertically disposed pathway which is approximately, in the illustrated embodiment, three times the overall height of a loaded basket. The floor of the chamber may be considered to be a very coarse grating 13 which is spaced above the extreme bottom 14 of the cabinet, and the ceiling of the chamber may have a similar grating 15 spaced below the roof 16 of the lid 6 to form therewith a compartment of about the same volume and shape as the compartment defined by the bottom 14 and floor 13.

In each of these upper and lower compartments which bound the internal chamber of the cabinet I provide sources of sterilizing rays, conveniently ultra-violet bulbs 17 which may be socketed in the walls 11 and 12 by connections extending through the wall compartments and including in the circuit any necessary or desirable transformer, switch, safety cutout and the like, and a supply cord extending from the cabinet to any usual electrical outlet.

The surface behind the upper bulbs is best made highly reflective, and reflectors 18 are provided below the bottom bulbs, and with a single exception hereinafter to be noted the walls of the whole chamber are made similarly reflective, as by employing specular finished aluminum or the like, all to the end that sterilizing radiations from the bulbs will be reflected throughout the chamber.

A door 19 having a height somewhat greater than that of either of the openings 8 and 9 is mounted for sliding movement across these openings in side channels formed by Z-shaped members 20 bounding the zone of the openings in the front wall, and the lower edge of the door may be adapted to drop into a similar channel 21 horizontally disposed below the bottom of the lower opening. The front face of the door is best made perfectly flat and unprovided with knobs or other projections. The extreme side margins of the door lap the wall compartments, and from the door a lug 22 projects through a slot in the front wall 2, into the right hand wall compartment, and a similar lug 23 extends from the door through an appropriate slot in the left hand wall compartment. These slots are long enough to accommodate their lugs during travel of the door between its extreme upper and lower positions.

Figure 5:
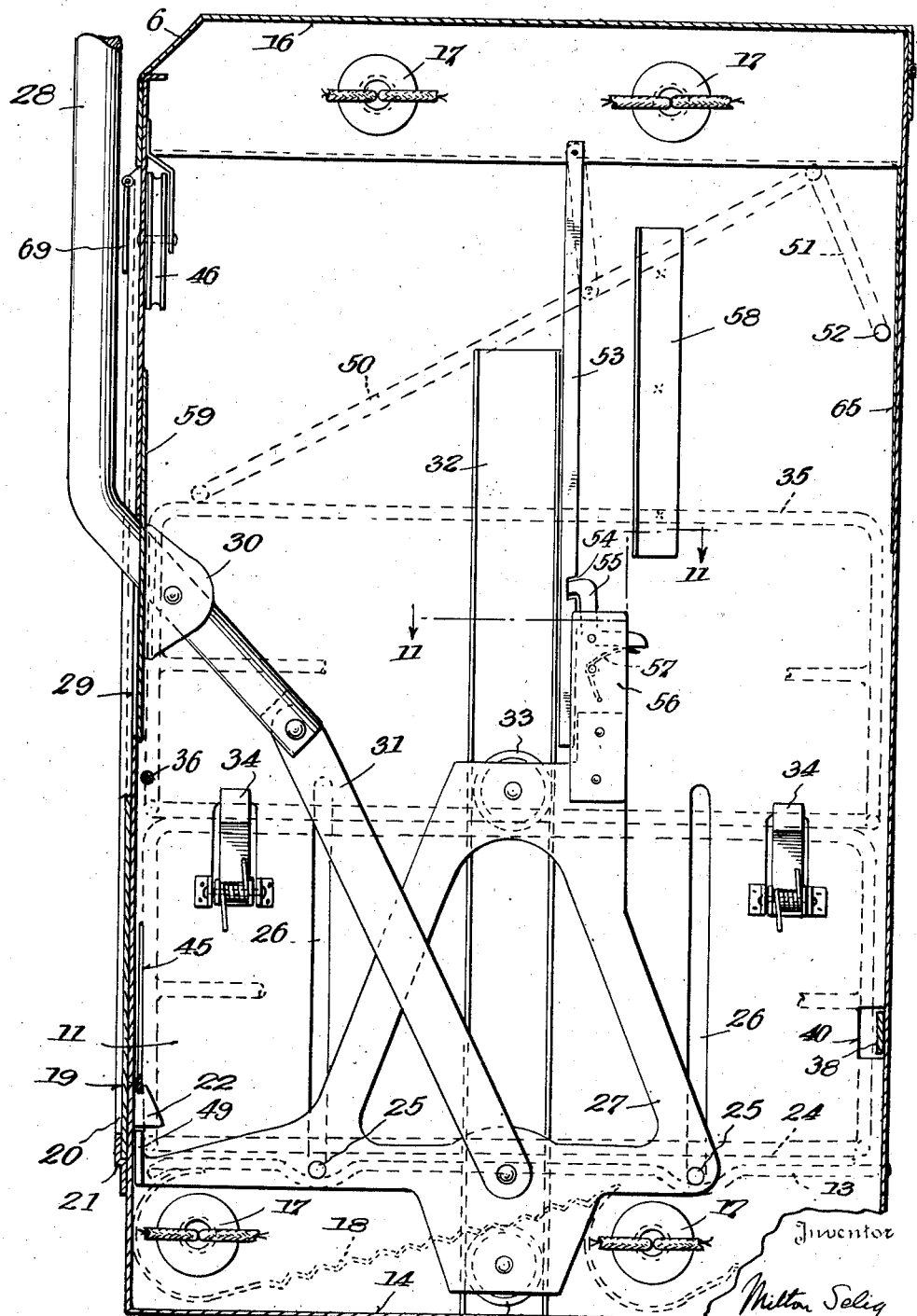
Fig. 5 is a sectional view showing in elevation certain operating parts in one of the wall compartments, with the support-moving means in lowered position.
Figure 9:
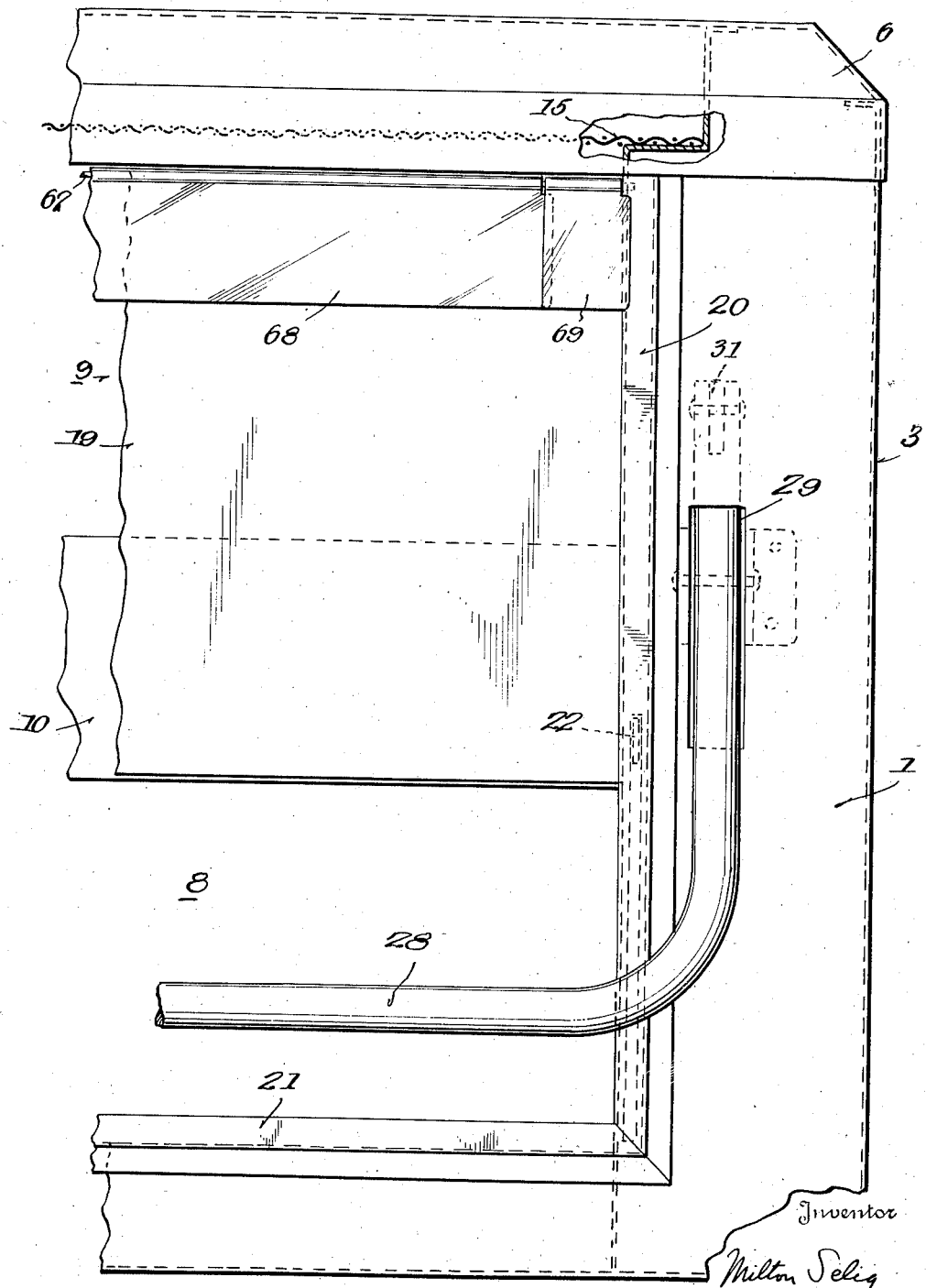
Fig. 9 is a detail view of part of the front of the cabinet.

A support in the form of a carriage or platform 24, of skeletonized wire or rod construction normally rests, in its lowermost position, on the grating 13 and extends from side to side of the cabinet chamber. Two cross rods 25, 25 of this support, which may be called an elevator, extend through vertical slots 26, 26 formed in each of the walls 11 and 12, and in each of the wall compartments the terminals of these extensions 25 are connected to an elevator plate 27 of special shape as best shown in Figs. 5 and 6 for the right hand side and Figs. 7 and 8 for the left hand side.

Elevating force applied to these plates 27 will lift the support 24 and a basket which may be resting on it. I provide novel means for applying this elevating force in the form of an operating handle 28, comprising a generally U-shaped bar having lever arms at its opposite lower extremities which project into the wall compartments of the cabinet through slots 29 in the front wall 2. The middle portion of the exposed part of the handle 28 extends across the front of the cabinet, and preferably a slight distance above the lid, so that it may be conveniently grasped by an operator and pulled down from its normally elevated position shown in Fig. 1. The ends of the handle which extend into the cabinet are fulcrumed in ears 30 in the wall compartments, and the work end of each of these two levers in which the handle 28 terminates is connected by a rigid link 31 to a point on the adjacent elevator plate 27. It will be obvious that when the handle 28 is pulled down lifting force is transmitted to the plates 27 and the support 24.

In order to guide the elevating parts so that they will unfailingly rise and function smoothly and quietly and so that the opposite sides and ends of the support 24 will rise on an even keel regardless of unbalance in the load on the support, I employ guide means comprising a vertical channel guideway 32 rigidly fixed in each wall compartment and receiving a pair of vertically spaced antifriction rollers 33 journalled in each plate 27. It will be obvious that this arrangement constrains the support 24 to rise and descend without wobbling or canting regardless of inequalities in the load or the angular direction of the force in the link 31.

As in my prior constructions, in the operation of this cabinet a basket containing glassware or the like to be sterilized is inserted through the lower opening 8, onto the support 24, and when the handle 28 is pulled down this basket is elevated until it snaps over and becomes supported on clips or the like 34 which are resiliently spring pressed from the walls 11 and 12 into the chamber, with cam surfaces facing the rising basket and horizontal shoulders onto which the basket snaps and which thereupon support the basket. The handle 28, being allowed to rise, support 24 descends while the clips 34 support the basket, shown at 35 in the intermediate zone of the chamber.

If a second basket be then inserted and elevated it will become supported on the clips 34 and will itself support the first basket, which now assumes the position opposite the withdrawal opening 9, in the upper zone of the chamber, through which the glasses or the like may be removed individually, or the entire basket may be removed. It will be understood that during the passage of the baskets and their loads through the chamber the bulbs 17 were performing their sterilizing function in a manner now well understood. It will also be obvious that having raised two baskets to the intermediate and uppermost positions respectively, the support 24 drops again to its lowermost position to receive a third basket which, of course, cannot be elevated until the basket opposite the withdrawal opening is removed from the chamber.

The foregoing cycle of operations is incorporated in my prior constructions and is not the subject of the present invention. As hereinabove indicated, an object of the present invention is to improve the mechanism by which the cyclic operation is effected, and to make that mechanism fool-proof and prevent the operator from frustrating its intended function.

I shall now proceed to describe certain preferred embodiments which the novel mechanism may take, beginning with the door 19 and its ancillary structure.

Figure 10:
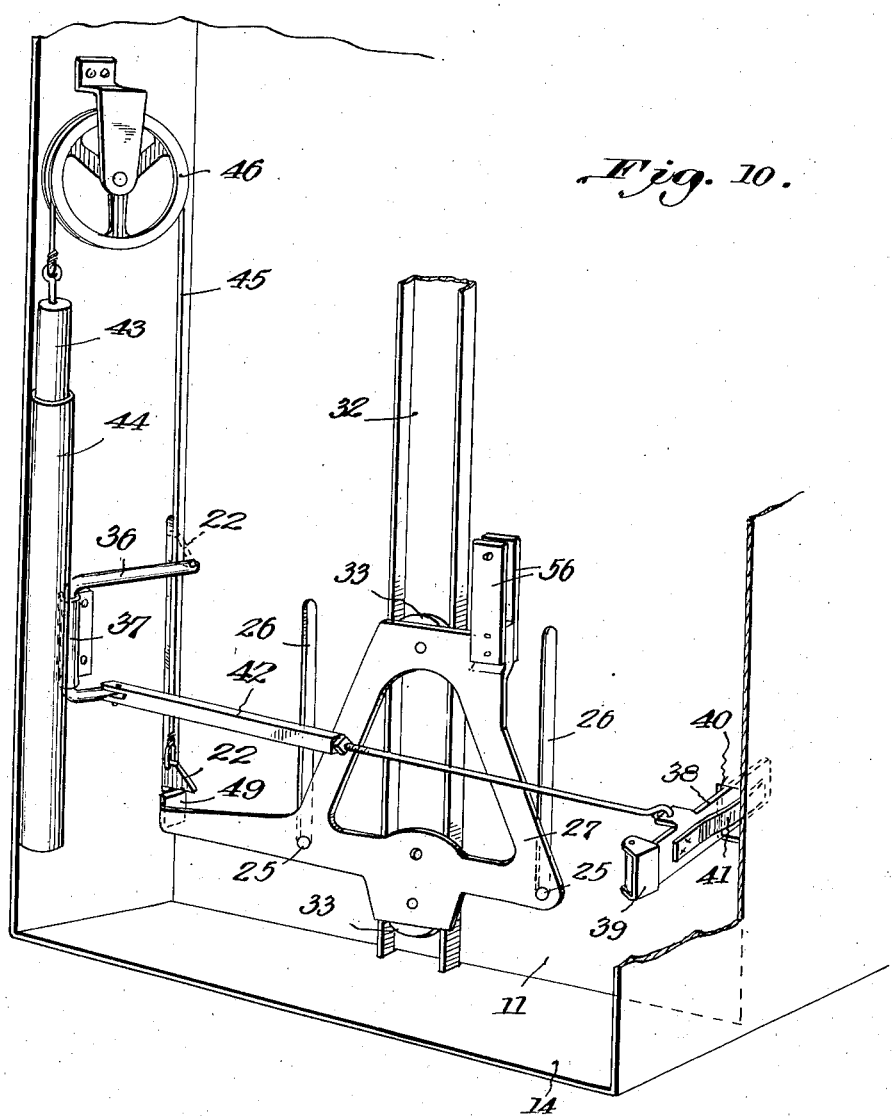
Fig. 10 is a detail perspective view showing certain of the parts in the wall compartment illustrated in Fig. 5, and showing certain additional parts in said compartment.
Figure 11:
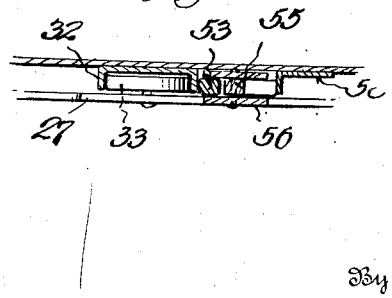
Fig. 11 is a horizontal section taken on the line 11—11 of Fig. 5.

Let it be assumed that the door 19 is in elevated position so as not to obstruct the lower, admission opening 8 when the lower zone of the chamber is empty and a basket is to be inserted onto the support 24. The door is held in this elevated position by the latch device illustrated in Fig. 10, which includes a bolt 36 pivoted in a bearing 37 mounted in one of the wall compartments and spring pressed toward the front wall 2 of the cabinet. The lug 22 presents, on rising, a cam face to the bolt 36 so that the lug snaps over the bolt and becomes held up by it as shown in Fig. 10. The lower opening 8 is thus unobstructed for admission of a basket. I provide means for dropping the door to close or obstruct the admission opening upon insertion of a basket through that opening. This means may comprise an arm 38 pivoted in a bracket 39 mounted in the rear of one of the wall compartments and extending through an aperture 40 in the adjacent inner wall 11 or 12 of the chamber. Spring means or the like, such as the leaf spring 41 which is carried by the arm 38 and bears against the back wall 5 of the cabinet urges arm 40 toward the front of the chamber, where it will be contacted by an incoming basket, and the link 42, which may include an adjustable connection, connects the arm 38 with the bolt 36, all as shown in one form of embodiment in Fig. 10. It will be evident that bolt 36 is normally projected by the spring 41 into latching relationship with the lug 22, and that the pressure of an incoming basket will push the arm 38 back against the force of the spring and pull link 42 to release the bolt 36 from lug 22 and permit the door to fall by gravity, so that as soon as a basket is inserted in the opening the opening becomes closed, or at least sufficiently obstructed to prevent removal of the basket through the admission opening. To counterbalance the door I prefer to connect a weight 43, travelling in a guide 44 fixed in the wall compartment, with the lug 22 by means of a cord 45 trained over a pulley 46 bracketed in the wall compartment. The counterbalance is best duplicated at both sides of the door and is preferably so proportioned that the door will drop gently down so as not to injure the fingers of the operator, should his hands not be promptly withdrawn from the chamber.

Having dropped to close the lower opening, the door becomes latched to the elevating means, so that any attempt to raise the door, as for the purpose of gaining access to the newly admitted basket, will cause that basket to rise with the door if there be no basket in the upper zone of the chamber, or so that the door cannot be raised if the chamber be full and the basket in the lower part thereof cannot be raised. Such latching means may take the form of the spring keeper 47 shown in Figs. 7 and 8 and carried by a forwardly projecting portion of one of the elevator plates 27 and conveniently provided with a plurality of shoulders which snap over the door lug 23.

It will be apparent that, with a basket inserted in the lower zone of the chamber the door will be in its lowermost position, obstructing the admission opening and will be latched to the support-moving means, as shown in Fig. 7. When the newly inserted basket is raised, by operation of the handle 28, the door rises with it to clear the admission opening for insertion of another basket. This requires that the support 24 drop, after its basket has been delivered to the clips 34, while the door remains open. The door will be held open, as has been explained, by bolt 36, but it will be perceived that it is necessary to disengage the latch 47 from the lug 23. To effect this disengagement I provide a pin 48 in the appropriate wall compartment which engages the rising keeper 47 and frees the lug 23 from it, as will be evident from a comparison of Figs. 7 and 8. Of course, the projecting end of the keeper is so proportioned with respect to the position of the pin 48 that when the dropping keeper snaps past the pin the shoulders of the keeper will have cleared the shoulder of the lug 23.

To transmit lifting force from the support-moving means to the door, so as to move the door upwardly with the support 24, I form a shoulder 49 on the forwardly projecting part of each elevator plate, which shoulder is always below its lug 22 or 23, so that lifting force is transmitted equally to each side of the door and the door rises with no tendency to bind.

It will be understood that the elevating of a basket into the uppermost zone of the chamber, opposite the withdrawal opening 9, will be followed by removal of the sterilized articles individually through the opening or of the basketful simultaneously, after the withdrawal opening becomes opened by descent of the door, which descent will be effected only by insertion of a new basket into the lower zone of the chamber and its engagement with the arm 38. In order to prevent the operator from reaching in through the unobstructed withdrawal opening 9, after removal of the uppermost basket, and removing articles from the tray in the intermediate position, shown at 35 in Fig. 5, and also to prevent an irresponsible operator from inserting a basket through the opening 9 when the upper zone of the chamber is empty, I provide novel guard means which will now be explained. This guard means may take the form of a coarse grating 50 of wire or the like which has depending arms 51 at each side of its back terminating in pintle portions 52 which are journalled in openings in the internal walls 11 and 12 so that the guard may swing between a bottom position shown in Fig. 5, in which the front edge of the guard rests on the intermediate basket 35, and an upper position, shown in Fig. 6, in which the guard is substantially horizontal and its front edge rests on a basket in the uppermost zone. The arrangement is such that upon withdrawal of the uppermost basket the guard will fall to its lower position and will become locked in that position so that no basket can be inserted through the upper opening 9 and access to articles on the intermediate basket 35 is denied to an operator reaching through the upper opening 9. This locking arrangement may comprise an arm 53 pivotally slung from one or both side edges of the guard and extending therefrom, over the top of the wall 11 or 12 into the adjacent wall compartment. This arm 53 reciprocates vertically as the guard moves up and down, and bears against an edge of the channel guideway 32. When the arm is in its lower position a notch 54 formed in it receives an angle bolt 55 pivoted in an extension 56 formed on the upper part of one of the elevator plates 27 and urged, as by the spring 57, into the notch. It will be obvious that this arrangement locks the guard with relation to the support-moving means, so the guard cannot be lifted before the support 24 is raised. When the support 24 is raised, by elevation of the plates 27, the guard rises progressively with it and a projecting rear end of the bolt 55 engages a release element in the form of an angle member 58 mounted in the wall compartment and is withdrawn thereby from the notch 54, so that the plate 27 and support 24 may descend while the guard 50 remains elevated as shown in Fig. 6.

The elements 13 and 15, which I have called gratings, protect the adjacent bulbs from tampering and from accidental contact with objects that might injure them. It will be recognized that the grating 15 constitutes a stop or limit for the upward movement of the guard 50, should the guard be so mounted that its momentum might otherwise carry it into contact with the upper bulbs. Accordingly, the element 15 may take any form appropriate to accomplish this purpose. For example, this element may be radically skeletonized, or may even be a single rod or a finger or two acting as an abutment or stop for the guard, in which case the guard will be relied on to protect the upper bulbs when the guard is in its elevated position.

In order to prevent the escape of rays from the chamber through the slot in the front wall 2 of the cabinet through which the handle 28 projects, I may mount a plate 59 about the handle, for sliding along the inner faces of the wall 2 so as to lap the margins of each slot during movement of the handle therein.

Figure 14:
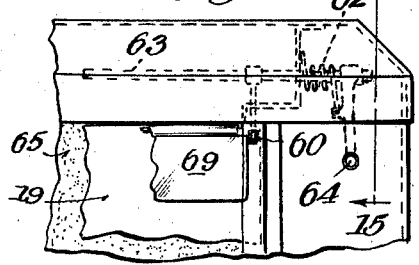
Fig. 14 is a fragmentary front elevational view of the cabinet, showing a modification.
Figure 15:
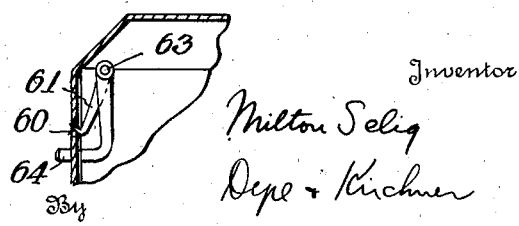
Fig. 15 is a sectional view taken on the line 15—15 of Fig. 14.

In some cases it may be desirable to provide for manual, non-automatic dropping of the door, whether or not a basket becomes inserted through the admission opening of the chamber. Such means may take the form shown in Figs. 14 and 15, where the upper edge of the door is provided with a small perforation 60 into which is urged a bolt 61 by the influence of a spring 62 cooperating with the bolt and a shaft 63 on which the bolt is pivoted. A button 64 may extend from the front wall 2 of the cabinet to rock the bolt from engagement with the door, to release the door to fall to its lowermost position.

As has been stated, the interior of the chamber is made reflective to increase the efficiency of the sterilizing rays. However, it is desirable to prevent escape of rays through the openings, and inasmuch as the upper opening 9 is normally unobstructed by the door 19 through longer periods of operation than is the opening 8, and since this upper opening is more nearly aligned with the eye level of the operator and patrons, I provide special means for minimizing the escape of rays through the upper opening. The several lamps are so positioned that their direct rays will not be apt to strike the eyes of persons in the vicinity of the cabinet, but some of the rays from the upper lamps would ordinarily be reflected from the back wall of the chamber through the upper opening. To prevent such reflection I prefer to provide a panel 65 of dull, absorptive material across the back wall of the chamber generally opposite the upper opening. The decrease in efficiency consequent upon the diminution of reflection is negligible, while the panel to a large extent eliminates reflection of harmful rays through the upper opening.

In order to shade the eyes of persons in the vicinity of the cabinet from direct rays emanating from the upper bulbs, and to serve the additional function of requiring the operator to remove beverage glasses by their lower portions and not pick them out by their rims, I prefer to include a flap means 66 pivoted on a shaft 67 mounted across the top of the upper opening, so that the flap means hangs in front of the door guides 20 and has its extreme margins overlapping them. The flap is best made of some material which is transparent or translucent to the visible part of the spectrum and substantially opaque to ultra-violet rays. Such materials as "Pyralin," "Plastacele," "Lucite" and the like are satisfactory for the purpose. I prefer to make the flap means in three parts, comprising a center element 68 and a pair of end elements 69, so arranged that, viewed from the front of the cabinet, each end element overlaps the margin of the opening and the margin of the center element. Thus, the center element is free to swing inwardly should it be rubbed by the hand of an operator reaching for an article, and is free to swing outwardly and carry the end elements with it when impinged by an article which is being withdrawn. However, while the end elements are free to swing outwardly when impinged by the side rails of a basket which is being withdrawn, they cannot swing inwardly to accommodate the side rails of a basket which the operator may try to insert through the opening.

The flap means may bear advertising or other indicia, printed, etched or in any other way inscribed on it. It will be evident that the translucence of the material adapts the flap means to display indicia very attractively.

Figure 12:
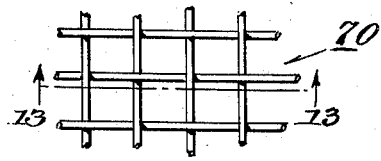
Fig. 12 is a detail of the floor of a basket.
Figure 13:
Fig. 13 is a sectional view taken along the line 13—13 of Fig. 12.
Figure 3:
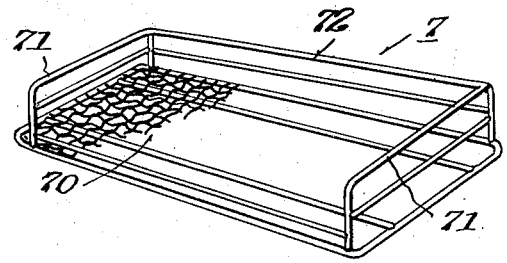
Fig. 3 is a perspective view of one of the baskets or supports for the articles in the cabinet.
Figure 4:
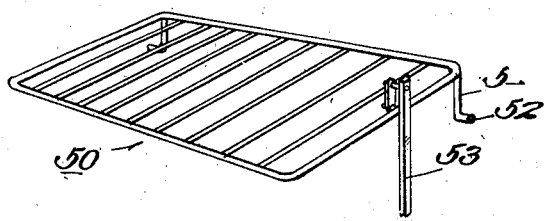
Fig. 4 is a perspective view of a guard which serves to prevent access to articles in the cabinet below the withdrawal opening.

A preferred type of basket is shown in Fig. 3 and comprises generally a floor 70, side rails 71 and a back rail 72. The rails and the frame of the floor may be made of suitable stout bar stock, but I prefer to keep the thickness of this material down to a minimum commensurate with requisite strength, in order to minimize the shading of the articles from the sterilizing rays. The floor of the basket is preferably made of relatively coarse woven wire, presenting a reticulated or basket weave with interstices just small enough to give proper support to the articles intended to be carried by the basket. In ordinary wire mesh the weave is such that the individual wires make line contact with a surface laid on the mesh. I prefer to employ a weave like that shown in Figs. 12 and 13, where the wire is provided with regularly recurring humps 73 between cross wires, so that an article to be sterilized will be supported at the point which constitutes the apex of a hump and will not have a line of wire in contact with it, so that shading of the article from the lower bulbs is reduced to a minimum and a maximum of clearance is provided for access to the article by rays which are reflected angularly toward it.

Unlike the swinging door used in one of my prior constructions, the sliding door of the present invention always presents the same face outwardly toward the observer. This outer face may therefore be given a finish to harmonize with that of the rest of the cabinet exterior, and it may bear a name plate which will always be prominently in evidence. The opposite face of the door, which always faces inwardly, may be made highly reflective like all the rest of the chamber surface except the panel 65.

The sliding door, particularly in the preferred automatic embodiment hereinabove explained does not require the operator to pick with his fingers at its free edge to swing the door to closed position, and since the door slides vertically in a single plane which is approximately that of the front wall of the cabinet, the overall space required for a cabinet in operation is considerably less than that which is required for a cabinet having a swinging door. This is frequently an important consideration in the constricted space behind a soda fountain, bar or the like.

It will be remembered that the foregoing explanation is that of the species or embodiment shown in the drawings, and does not purport to define other embodiments of the inventive principles. The scope of the invention is pointed out in the appended claims, which are intended to be construed as broadly as may be permitted by their express terms and by the state of the prior art.

I claim:

1. In a sterilizing cabinet for articles of tableware and the like, an upright chamber, means supplying sterilizing rays to said chamber, mechanism for elevating articles in said chamber comprising a horizontally disposed carriage, upright members connected to the carriage at the opposite sides thereof, rigid vertical guideways fixed in the cabinet adjacent said members, a plurality of vertically spaced apart means carried by each of the members and guided by the adjacent guideway, and means for applying an elevating force to the carriage comprising longitudinally rigid linkage members connected to each of the upright members.

2. In a sterilizing cabinet for articles of tableware and the like, an upright chamber, means supplying sterilizing rays to said chamber, mechanism for elevating articles in said chamber comprising a horizontally disposed carriage, upright members each connected at plural, horizontally spaced points to the carriage at one of the two opposite sides thereof, rigid vertical guideways fixed in the cabinet adjacent said members, a plurality of vertically spaced apart means carried by each of the members and guided by the adjacent guideway, and means for applying an elevating force to the carriage comprising longitudinally rigid linkage members connected to each of the upright members.

3. In a sterilizing cabinet for articles of tableware and the like, an upright chamber, means for sterilizing articles within the chamber, mechanism for conveying articles vertically through the chamber comprising a horizontally disposed carriage, upright members connected to the carriage at the opposite sides thereof, rigid vertical guideways fixed in the cabinet adjacent said members, means carried by said members and cooperating with the adjacent guideway to guide the carriage during vertical movement in the chamber, at least one of said guiding means comprising a plurality of vertically spaced elements whereby tilting of the carriage from front to rear of the chamber is substantially prevented, and means for applying force to move the carriage vertically in the chamber comprising longitudinally rigid linkage members connected to each of the upright members.

4. In a sterilizing cabinet for articles of tableware and the like, an upright chamber, means for sterilizing articles within the chamber, mechanism for conveying articles vertically through the chamber comprising a horizontally disposed carriage, an upright member connected at plural, horizontally spaced points to each opposite side of the carriage, a rigid vertical guideway fixed in the cabinet adjacent each of said members, a plurality of vertically spaced apart means carried by each of the members and guided by the adjacent guideway, and means for applying force to move the carriage vertically in the chamber comprising longitudinally rigid linkage members connected to each of the upright members.

5. In a sterilizing cabinet for articles of tableware and the like, an upright chamber, means for supplying sterilizing rays to said chamber, mechanism for elevating articles in said chamber comprising a horizontally disposed carriage, an upright member connected at plural, horizontally spaced points to each opposite side of the carriage, a vertical channel guideway fixed in the cabinet adjacent each of said members and opening toward the adjacent member, a plurality of vertically spaced rollers mounted on each member and received in the adjacent guideway, and means hanging the members for vertical movement of the carriage in the chamber, said means comprising longitudinally rigid linkage members connected to each of the upright members.

6. In a sterilizing cabinet for articles of tableware and the like adapted to be mounted for use in the constricted space behind a soda fountain, bar or the like, means forming an upright chamber and including a wall having vertically spaced admission and withdrawal openings for the articles, a source of sterilizing rays for the chamber, means for moving the articles vertically within the chamber between positions opposite said openings, a door slidably associated with said wall for vertical movement in a single plane along said wall to obstruct selectively said admission opening or said withdrawal opening and biased normally to obstruct the admission opening, means moving the door to obstruct the withdrawal opening as the articles move toward said opening, and means for thereafter releasing the door to uncover the withdrawal opening and obstruct the admission opening.

7. In a sterilizing cabinet for articles of tableware and the like adapted to be mounted for use in the constricted space behind a soda fountain, bar or the like, means forming an upright chamber and including a wall having vertically spaced admission and withdrawal openings for the articles, a source of sterilizing rays for the chamber, means for moving the articles vertically within the chamber between positions opposite said openings, a door slidably associated with said wall for vertical movement in a single plane along said wall to obstruct said openings alternatively, means moving the door to obstruct the withdrawal opening responsive to movement of said articles toward a position opposite said opening, means for releasing the door from its last named position, and means for moving the released door to a position obstructing the admission opening.

8. In a sterilizing cabinet for articles of tableware and the like, means forming an upright chamber and including a wall having vertically spaced admission and withdrawal openings for the articles, a source of sterilizing rays for the chamber, means for moving the articles vertically within the chamber between positions opposite said openings, a door associated with said wall for obstructing said openings alternatively, means moving said door toward obstructing relation with the withdrawal opening progressively responsive to movement of said articles toward a position opposite that opening, and means for thereafter moving said door to a position obstructing the admission opening.

9. In a sterilizing cabinet for articles of tableware and the like, means forming a chamber having spaced admission and withdrawal openings for the articles, a source of sterilizing rays for the chamber, means for moving the articles within the chamber between positions opposite said openings, a door associated with the chamber for obstructing said openings alternatively, means moving said door toward obstructing relation with the withdrawal opening progressively responsive to movement of said articles toward a position opposite that opening, and means for thereafter moving said door to a position obstructing the admission opening.

10. In a sterilizing cabinet for articles of tableware and the like, means forming a chamber having spaced admission and withdrawal openings for the articles, a source of sterilizing rays for the chamber, a support for said articles, means for moving said support within the chamber between positions opposite said openings, a door associated with the chamber for obstructing said openings alternatively, and means moving said door to obstruct the admission opening responsive to insertion of said support into the chamber through said admission opening.

11. In a sterilizing cabinet for articles of tableware and the like, means forming a chamber having spaced admission and withdrawal openings for the articles, a source of sterilizing rays for the chamber, a support for said articles, means for moving said support within the chamber between positions opposite said openings, a door associated with the chamber for obstructing said openings alternatively, means moving said door to obstruct the admission opening responsive to insertion of said support into the chamber through said admission opening, and means moving said door toward obstructing relation with the withdrawal opening responsive to movement of the support toward a position opposite the withdrawal opening.

12. In a sterilizing cabinet for articles of tableware and the like, means forming a chamber having spaced admission and withdrawal openings for the articles, a source of sterilizing rays for the chamber, a plurality of supports for said articles, means for moving said supports within the chamber between positions opposite said openings, a door associated with the chamber for obstructing said openings alternatively, means moving said door to obstruct the admission opening responsive to insertion of a support into the chamber through said admission opening, and means moving said door to obstruct the withdrawal opening responsive to movement of a support to a position opposite the withdrawal opening.

13. In a sterilizing cabinet for articles of tableware and the like, means forming a chamber having spaced admission and withdrawal openings for the articles, a source of sterilizing rays for the chamber, a plurality of supports for said articles, means for moving said supports within the chamber between positions opposite said openings, a door associated with the chamber for obstructing said openings alternatively, means moving said door to obstruct the withdrawal opening responsive to movement of a support to a position opposite the withdrawal opening, means moving the door to obstruct the admission opening responsive to insertion of a support into the chamber through the admission opening, and means latching the door to the support-moving means when the door is in position obstructing the admission opening.

14. In a sterilizing cabinet for articles of tableware and the like, means forming a chamber having spaced admission and withdrawal openings for the articles, a source of sterilizing rays for the chamber, a plurality of supports for the articles, means for moving the supports within the chamber between positions opposite the openings, a door associated with the chamber for obstructing the openings alternatively, means connecting the door and the support-moving means constraining the door to move toward a position obstructing the withdrawal opening when the support-moving means moves in said direction, means releasing said connection when the support-moving means has moved a predetermined distance in said direction whereby the support-moving means is free to move back to a position opposite the admission opening free of the door, and means moving the door to obstruct the admission opening responsive to insertion of a support into the chamber through the admission opening.

15. In a sterilizing cabinet for articles of tableware and the like, means forming a chamber having spaced admission and withdrawal openings for the articles, a source of sterilizing rays for the chamber, a plurality of supports for the articles, means for moving the supports within the chamber between positions opposite the openings, a door associated with the chamber for obstructing the openings alternatively, means connecting the door and the support-moving means constraining the door to move toward a position obstructing the withdrawal opening when the support-moving means moves in said direction, means releasing said connection when the support-moving means has moved a predetermined distance in said direction whereby the support-moving means is free to move back to a position opposite the admission opening free of the door, means holding the door against movement while the support-moving means moves back to said position, and means releasing the holding means and moving the door to obstruct the admission opening responsive to insertion of a support into the chamber through the admission opening.

16. In a sterilizing cabinet for articles of tableware and the like, means forming a chamber having spaced admission and withdrawal openings for the articles, a source of sterilizing rays for the chamber, a plurality of supports for said articles, means for moving said supports within the chamber between positions opposite said openings, means obstructing the withdrawal opening responsive to movement of the support-moving means a predetermined distance toward the withdrawal opening, and means obstructing the admission opening and opening the withdrawal opening responsive to insertion of a support into the chamber through the admission opening.

17. In a sterilizing cabinet for articles of tableware and the like, means forming a chamber and including a wall having spaced admission and withdrawal openings, a source of sterilizing rays for the chamber, supports for the articles, means for moving said supports within the chamber between positions opposite the admission and withdrawal openings, a door slidably associated with said wall for obstructing said openings alternatively, means connecting the door and the support-moving means constraining the door to slide from a position obstructing the admission opening to a position obstructing the withdrawal opening when the support-moving means moves a predetermined distance in said direction, and means responsive to insertion of a support into the chamber through the admission opening for sliding the door from a position obstructing the withdrawal opening to a position obstructing the admission opening.

18. In a sterilizing cabinet for articles of tableware and the like, means forming an upright chamber and including a wall having vertically spaced openings including an upper withdrawal opening and a lower admission opening, a source of sterilizing rays for the chamber, supports for the articles, means for elevating said supports within the chamber from a position opposite the admission opening to a position opposite the withdrawal opening, a door vertically slidable on said wall for obstructing said openings alternatively, means connecting the door and the support-moving means for raising the door from a position obstructing the admission opening to a position obstructing the withdrawal opening when the support-moving means rises a predetermined distance, and means responsive to insertion of a support into the chamber through the admission opening for dropping the door to obstruct the admission opening.

19. In a sterilizing cabinet for articles of tableware and the like, means forming an upright chamber and including a wall having vertically spaced openings including an upper withdrawal opening and a lower admission opening, a source of sterilizing rays for the chamber, supports for the articles, means for elevating said supports within the chamber from a position opposite the admission opening to a position opposite the withdrawal opening, a door vertically slidable on said wall for obstructing said openings alternatively, means connecting the door and the support-moving means for raising the door from a position obstructing the admission opening to a position obstructing the withdrawal opening when the support-moving means rises a predetermined distance, means holding the door in said raised position, means responsive to insertion of a support into the chamber through the admission opening for releasing said holding means whereby the door may drop to a position obstructing the admission opening, and means latching the door to the support-moving means when both are in the lower position whereby elevation of the door from said position will elevate the support-moving means also, thereby removing the support-moving means from its position opposite the admission opening.

20. In a sterilizing cabinet for articles of tableware and the like, means forming an upright chamber and including a wall having vertically spaced openings including an upper withdrawal opening and a lower admission opening, a source of sterilizing rays for the chamber, supports for the articles, means for elevating said supports within the chamber from a position opposite the admission opening to a position opposite the withdrawal opening, a door vertically slidable on said wall for obstructing said openings alternatively, means connecting the door and the support-moving means for raising the door from a position obstructing the admission opening to a position obstructing the withdrawal opening when the support-moving means rises a predetermined distance, means holding the door in said raised position, means responsive to insertion of a support into the chamber through the admission opening for releasing said holding means whereby the door may drop to a position obstructing the admission opening, means latching the door to the support-moving means when both are in the lower position whereby elevation of the door from said position will elevate the support-moving means also, thereby removing the support-moving means from its position opposite the admission opening, and means releasing the latching means when the door and support-moving means are in their elevated position, whereby the support-moving means may descend while the door remains held up by the holding means.

21. In a sterilizing cabinet for articles of tableware and the like, means forming a chamber and including a wall having an opening, a source of sterilizing rays for the chamber, means for positioning articles within the chamber behind said opening, and flap means having portions lapping the margins of the opening and pivotally mounted to swing out from the wall and not into the opening and obstructing part of the opening to constrain an operator reaching into the opening to grasp an end portion only of said articles for removing them.

22. In a sterilizing cabinet for beverage glasses and the like, means forming a chamber and including an upright wall having an opening disposed in a vertical plane, a source of sterilizing rays for the chamber, means for positioning said glasses within the chamber behind said opening, and flap means having portions lapping the margins of the opening and pivotally hanging across the upper zone of the opening to swing out from the wall and not into the opening and obstructing the upper zone of the opening to constrain an operator reaching into the opening to grasp the lower portions only of said glasses for removing them.

23. In a sterilizing cabinet for beverage glasses and the like, means forming a chamber and including an upright wall having an opening disposed in a vertical plane, a source of ultra-violet rays for the chamber, means for positioning said glasses within the chamber behind said opening, and flap means substantially translucent to visible rays but substantially opaque to ultra-violet rays having portions lapping the margins of the opening and pivotally hanging across the upper zone of the opening to swing out from the wall and not into the opening and obstructing the upper zone of the opening to constrain an operator reaching into the opening to grasp the lower portions only of said glasses for removing them.

24. In a sterilizing cabinet for beverage glasses and the like, means forming a chamber and including an upright wall having an opening disposed in a vertical plane, a source of sterilizing rays for the chamber, a support for positioning said glasses within the chamber behind said opening having elevated side rails, and flap means pivotally hanging across the upper zone of the opening to swing out from the wall upon withdrawal of a glass or said support and having portions lapping the margins of the opening whereby the flap means will be engaged by said rails and be prevented by its lapping portions from swinging inwardly to admit a support through the opening and into the chamber.

25. In a sterilizing cabinet for beverage glasses and the like, means forming a chamber and including an upright wall having an opening disposed in a vertical plane, a source of sterilizing rays for the chamber, a support for positioning said glasses within the chamber behind said opening having elevated side rails, and flap means pivotally hanging across the upper zone of the opening to swing out from the wall upon withdrawal of a glass or said support, said flap means comprising a center element and two end elements lapping the center element and the margins of the opening whereby the center element may swing outwardly with the end elements and inwardly without the end elements and whereby the end elements will be engaged by said rails and be prevented by their portions which lap the margins of the opening from swinging inwardly to admit a support through the opening and into the chamber.

26. In a sterilizing cabinet of the class wherein supports bearing articles being sterilized are moved through a sterilizing chamber to assume successively a position opposite an opening in a wall of the chamber through which the articles of one of the supports may be withdrawn, the combination with said chamber of a guard which is movable to inoperative position by the movement of a support to a position opposite said opening so that articles on said support may be withdrawn and which is movable to operative position upon removal of said support from the chamber whereby articles on the next adjacent support in the chamber are rendered inaccessible to an operator reaching through the opening.

27. In a sterilizing cabinet of the class wherein supports bearing articles being sterilized are elevated through a sterilizing chamber to assume successively a position opposite an opening in the upper part of a vertical wall of the chamber through which the articles on the uppermost support may be withdrawn, the combination with said chamber of a guard which is liftable to an inoperative position above the uppermost support so that articles on said support may be withdrawn and which drops upon removal of said support from the chamber to render articles on the next lower support inaccessible to an operator reaching through the opening.

28. In a sterilizing cabinet of the class wherein supports bearing articles being sterilized are elevated through a sterilizing chamber to assume successively a position opposite an opening in the upper part of a vertical wall of the chamber through which the articles on the uppermost support may be withdrawn, the combination with said chamber of a guard which is liftable to an inoperative position above the uppermost support so that articles on said support may be withdrawn and which drops upon removal of said support from the chamber to an operative position to render articles on the next lower support inaccessible to an operator reaching through the opening, and means for latching the guard in said operative position.

29. In a sterilizing cabinet of the class wherein supports bearing articles being sterilized are elevated through a sterilizing chamber to assume successively a position opposite an opening in the upper part of a vertical wall of the chamber through which the articles on the uppermost support may be withdrawn, the combination with said chamber of a guard which is liftable to an inoperative position resting on the uppermost support so that articles on said support may be withdrawn and which drops upon removal of said support from the chamber to an operative position to render articles on the next lower support inaccessible to an operator reaching through the opening, means for latching the guard in said operative position, and means constraining the guard to rise to inoperative position when said next lower support is moved to uppermost position.

30. A sterilizing cabinet for articles of tableware and the like comprising an upright chamber having a vertical wall provided with a lower admission opening and an upper withdrawal opening for said articles, a source of sterilizing rays for the chamber, a platform for supporting the articles within the chamber, and means for elevating the platform toward the withdrawal opening from a position opposite the admission opening including a lever fulcrumed on the cabinet and having a power arm projecting therefrom and a work arm extending thereinto, and link means connecting the work arm with the platform, said link means being stiff and longitudinally incompressible whereby to resist undesired rise of said platform.

31. In a sterilizing cabinet for articles of tableware and the like, means forming an upright chamber and including a wall having vertically spaced apart an upper withdrawal opening and a lower admission opening for said articles, a source of sterilizing rays for the chamber, means for moving the articles within the chamber between positions opposite said openings, a door slidably associated with said wall for obstructing said openings alternatively and biased to obstruct the admission opening, means moving the door to obstruct the withdrawal opening responsive to movement of the articles toward a position opposite that opening, means latching the door in said position, and manually operable means for releasing the latching means whereby to drop said door into obstructing relation with the admission opening.

32. In a sterilizing cabinet for articles of tableware and the like comprising a chamber having an opening in a wall thereof for passage of the articles, sources of sterilizing rays positioned adjacent the opening and normally energized while the opening remains open, means having reflecting surfaces adjacent the sources for reflecting rays into the chamber, and other means having a relatively absorptive and non-reflecting surface mounted in the cabinet in such relation to said sources and opening as to receive and substantially absorb rays falling at such angle of incidence as would normally be reflected through said opening.

33. In a sterilizing cabinet for articles of tableware and the like, means forming a chamber and including a wall having an opening, a source of sterilizing rays for the chamber, means for positioning articles within the chamber behind said opening, and flap means of relatively stiff material pivotally mounted across the upper part of the opening to swing out therefrom and having its lower edge spaced above the lower edge of the opening to provide an intervening space whereby the operator is constrained to reach into the opening through said space and grasp a lower portion only of said articles for removing them through the opening.

34. In a sterilizing cabinet of the class wherein supports bearing articles being sterilized are moved through a sterilizing chamber to assume successively a position opposite an opening in a wall of the chamber through which articles on one of the supports may be withdrawn, the combination with said chamber of a guard which is movable to inoperative position responsive to the movement of a support to a position opposite said opening so that articles on said support may be withdrawn and which is movable to operative position upon removal of said support from the chamber whereby articles on the next adjacent support in the chamber are rendered inaccessible to an operator reaching through the opening, and stop means limiting movement of the guard toward inoperative position.

35. A sterilizing cabinet for articles of tableware and the like comprising an upright chamber having a vertical wall provided with a lower admission opening and an upper withdrawal opening for said articles, a source of sterilizing rays for the chamber, a platform for supporting the articles within the chamber, and means for elevating the platform toward the withdrawal opening from a position opposite the admission opening including a pair of levers each being fulcrumed on the cabinet and having a work arm extending thereinto at opposite ends of the platform and power arms projecting from the cabinet and rigidly connected together, and link means connecting each work arm with an end of the platform, said link means being stiff and longitudinally incompressible whereby to resist undesired rise of either end of the platform, so that both ends of the platform are constrained to rise and fall equally.

MILTON SELIG.